(No Model.) 2 Sheets—Sheet 1.
W. STUART.
DOUBLE KNOT NETTING AND DEVICE FOR MAKING SAME.
No. 562,676. Patented June 23, 1896.
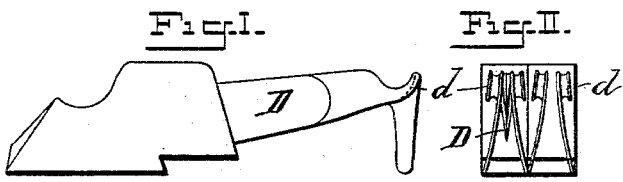
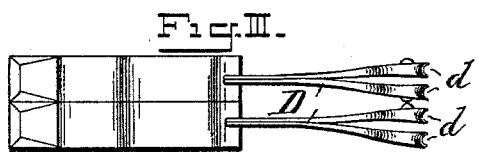
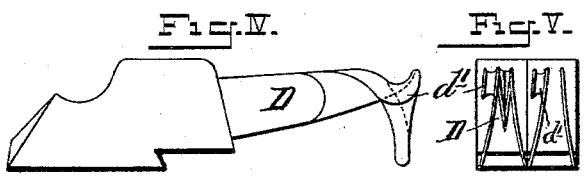
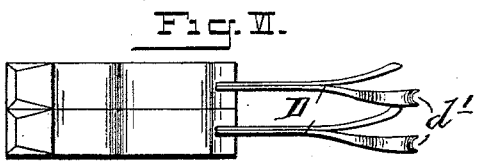
Witnesses,
J. Green
W. H. Pumphrey
Inventor,
WILLIAM STUART,
by Knight Bros
his Attorneys (No Model.) 2 Sheets—Sheet 2.
W. STUART.
DOUBLE KNOT NETTING AND DEVICE FOR MAKING SAME.
No. 562,676. Patented June 23, 1896.
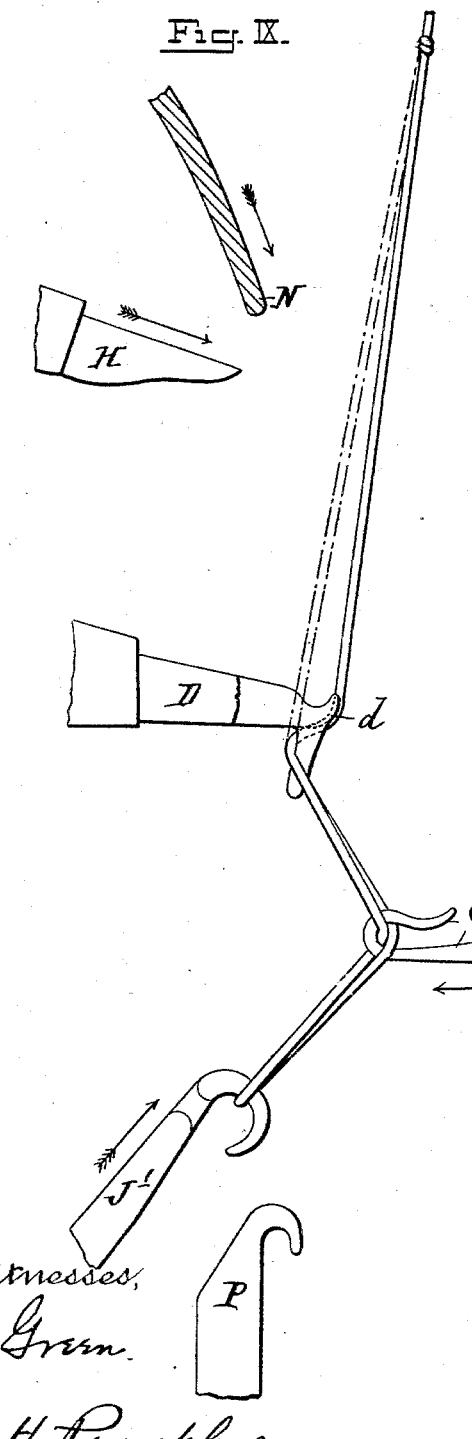
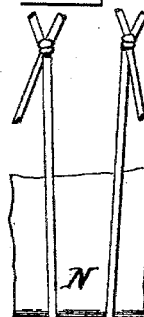
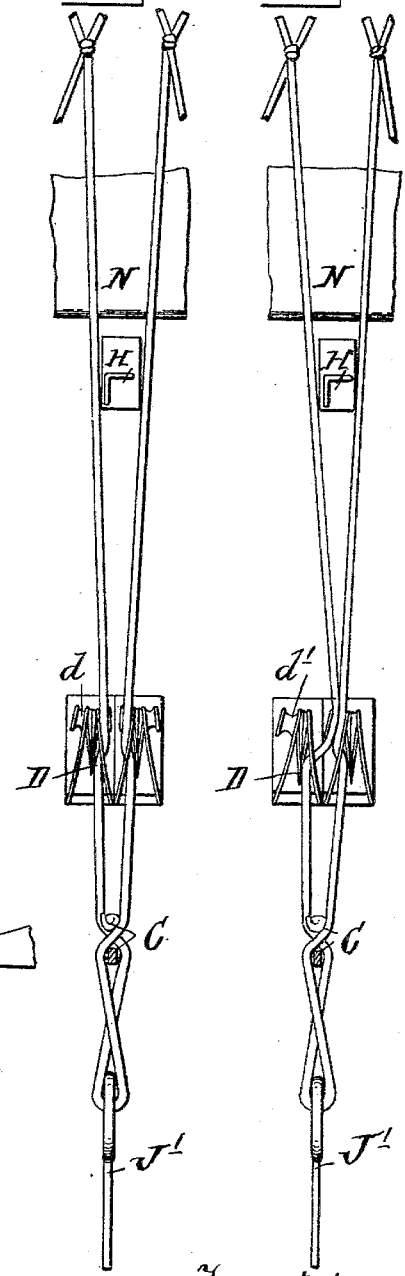
Witnesses
J. Green
W. H. Pumphrey
Inventor,
WILLIAM STUART,
by Knight Bros.
his Attorneys.

UNITED STATES PATENT OFFICE.

WILLIAM STUART, OF MUSSELBURGH, SCOTLAND.

DOUBLE-KNOT NETTING AND DEVICE FOR MAKING SAME.

SPECIFICATION forming part of Letters Patent No. 562,676, dated June 23, 1896.

Application filed September 5, 1895. Serial No. 561,529. (No model.)

*To all whom it may concern:*

Be it known that I, WILLIAM STUART, of the firm of J. & W. Stuart, net-manufacturers, a subject of the Queen of the United Kingdom of Great Britain and Ireland, residing at Esk Mills, Musselburgh, in the county of Mid-Lothian, Scotland, have invented Improvements in Double-Knot Netting and Devices for Making the Same, of which the following is a specification.

This invention relates to double-knot netting for fishing and other purposes, and to machinery employed for making the same.

In the formation of the knot on the double-knot net-machines the method has hitherto been to put only one leg of the last-formed half-mesh into the groove called the "wicker," which is on the one side of the "needle," and to keep out the other leg of the half-mesh, which causes a cross in the legs, one going inside the top loop and the other outside, and forms an uneven knot, when the four legs are drawn together, which will not properly lock. The wickers may be on the right or left hand side of the needles. In the formation of my improved knot the same parts and movements of the machine are employed, but I provide or form the needle with two wickers, one on each side, or I may form the needle with a widened or enlarged wicker, and both legs of the last-formed half-mesh are moved into the wickers or enlarged wicker and by this means a double knot is made of a different formation from the double knot made hitherto, both legs of the last-formed half-mesh being passed through the top loop together without any cross, the advantage being that this new knot slips into its place and locks with an even tension on all four legs of the mesh, and cannot afterward be caused to slip, whereas the usual double knot may be canted or overturned by drawing the two lower legs apart, and thus is liable to slip.

This invention is applicable to the machines at present in use, but more particularly to the class of machines described in the specification of J. & W. Stuart's British patent, of April 27, 1859, No. 1,056, as arranged for double-knot nets, that is to say, provided with a row of pushers mounted in a movable bar above the needles, and a row of back hooks mounted in another movable bar underneath the needles, in addition to the ordinary row of front hooks, needles, and fallers, and chapping-bar, the needles according to my present invention being formed with two wickers or with a widened or enlarged wicker, so as to enable both legs of the mesh to be chapped in by the chapping-bar in lieu of one, as hitherto.

In order that my invention may be fully understood, I will first describe the same with reference to the accompanying drawings, and afterward point out the novelty with more particularity in the annexed claims.

Figure 1 is a side elevation. Fig. 2 is an end elevation, and Fig. 3 is a plan showing a needle with two wickers. Figs. 4, 5, and 6 are similar views showing a needle with one enlarged or widened wicker. Fig. 7 is an open view of my improved knot before it is tightened up. Fig. 8 is a view of the same knot after it has been tightened up. Figs. 9, 10, and 11 are diagrammatic views showing the various positions of parts while the knot is being formed, said parts being slightly exaggerated for the sake of clearness.

Referring to the said drawings, the needles D are formed or provided with two wickers $d\ d$, (shown in Figs. 1, 2, and 3,) or with an enlarged or widened wicker $d'$, (shown in Figs. 4, 5, and 6,) and are carried in the needle-bar, which is supported by brackets attached to the cross-beam, which is carried by the main cheeks or framing of the machine, all as hitherto.

The arrangement and action of the machine provided with my improved needles is as follows: Supposing the machine is set to make double knots, as shown in Figs. 7 and 8, with the parts in the position which they assume after the front hooks C have been brought up from the fallers P, with the plain loops (having no crossed legs) from the said fallers P, by the operator through the medium of the hand-lever and fair-leader, as hitherto. He then causes his row of pushers H to come forward and so open out the loop as to enable the row of back hooks J' to be brought up and engaged with the loops, after which the front hooks C are manipulated so as to make and take the cross or twisted loop, after which the pushers H are drawn back, and the back hooks J' are lowered through the wickers of the needles D to a position as shown in Fig. 9, and at the same time the front hooks C are manipulated so as to take the cross down between the needles D and then out in front of the wickers $d$ of the said needles D, and retain them in the position shown in Fig. 9, so as to enable one of the legs of the loops to be chapped into each of the wickers $d$ when double-wickered needles are used, as shown in Figs. 1, 2, 3, 9, (full lines,) and 10; or with widened wickers, as shown in Figs. 4, 5, 6, and 11, both of the legs of the loops would be chapped into the broad wicker $d'$ of the needles, by means of the chapping-bar N, being forced down, after which the front hooks C are lifted up and also the back hooks J' are moved up as usual. The fallers P are then raised, the row formed, and the shuttle having the next cord $e$ attached is passed through, the fallers P knocked down by the slur, as hitherto, after which the front hooks C are moved down in front of the needles D, and along with the back hooks J', and needles D are then disengaged from the double knots by means of the chapping-bar N, and the said knots closed or tightened, as shown in Fig. 8, by the action of the beam as hitherto, and so on, repeating the foregoing operations for each row of knots made, the necessary lateral movements to the front hooks being obtained by the incliners and hand-lever as hitherto. My improved double knot thus formed has the two legs $c$ of the last-formed half-mesh (indicated by shaded lines in Figs. 7 and 8) extending through the top loop $f$ (the unshaded loop) of the knot, and the knot slips into place and locks with an even tension on all four legs $c\ e$.

I claim—

1. In machinery for making double-knot netting, the needles D constructed with two wickers $d$, whereby both legs of the mesh may be chapped in, as described and shown.

2. In machinery for making double-knot netting, the needles D constructed with an enlarged or widened wicker $d'$, whereby both legs of the mesh may be chapped in, as described and shown.

3. The improved formation of double knot for fishing and other nets having the two legs of the last-formed half-mesh extending through the top loop of the knot, substantially as described and shown.

WILLIAM STUART.

Witnesses:
 ALEXANDER M. MICHEN,
 EDWARD ARCHIBALD.